United States Patent
Hudepohl

(10) Patent No.: US 10,413,126 B2
(45) Date of Patent: Sep. 17, 2019

(54) UPTURNED PROTRUDING OVERSPILL SHIELD

(71) Applicant: Donald J. Hudepohl, Cincinnati, OH (US)

(72) Inventor: Donald J. Hudepohl, Cincinnati, OH (US)

( * ) Notice: Subject to any disclaimer, the term of this patent is extended or adjusted under 35 U.S.C. 154(b) by 226 days.

(21) Appl. No.: 15/443,089

(22) Filed: Feb. 27, 2017

(65) Prior Publication Data

US 2018/0242790 A1    Aug. 30, 2018

(51) Int. Cl.
| | | |
|---|---|---|
| *A47J 27/00* | (2006.01) | |
| *A47J 37/12* | (2006.01) | |
| *A47J 27/58* | (2006.01) | |
| *A47J 36/36* | (2006.01) | |
| *A47J 27/56* | (2006.01) | |

(52) U.S. Cl.
CPC .......... *A47J 37/1271* (2013.01); *A47J 27/58* (2013.01); *A47J 36/36* (2013.01); *A47J 37/1242* (2013.01); *A47J 27/56* (2013.01)

(58) Field of Classification Search
CPC ............. A47J 27/58; A47J 27/56; A47J 36/36
USPC ....... 99/339, 340, 446, 447, 645; 126/383.1, 126/384.1, 385.1, 386.1, 51
See application file for complete search history.

(56) References Cited

U.S. PATENT DOCUMENTS

| | | |
|---|---|---|
| 834,733 A | 10/1906 | Jeha |
| 881,199 A | 3/1908 | Palmer |
| 1,090,045 A | 3/1914 | Gladden |
| 1,353,265 A | 9/1920 | Oshige |
| 1,622,587 A | 3/1927 | Housel |
| 2,003,773 A | 6/1935 | Gross |
| D97,336 S | 10/1935 | Richheimer |
| 2,282,400 A | 5/1942 | Ginnel |
| 2,797,298 A | 6/1957 | Fujitani |
| 3,177,344 A | 4/1965 | Morey |
| 4,337,752 A | 7/1982 | Leounes |
| D282,340 S | 1/1986 | Lam |
| D290,995 S | 7/1987 | Diamond |
| 4,729,297 A | 3/1988 | Iranzadi |
| 5,033,453 A | 7/1991 | Loyd |
| 5,336,017 A | 8/1994 | Nichols |
| D395,195 S | 6/1998 | Heiberg |
| 5,813,321 A | 9/1998 | Bourgeois |
| 6,302,095 B1 | 10/2001 | Tolley |
| 6,593,550 B1 | 7/2003 | Royer |

(Continued)

FOREIGN PATENT DOCUMENTS

DE          806478      *   6/1951    ............. A47J 27/58

*Primary Examiner* — Reginald Alexander
(74) *Attorney, Agent, or Firm* — Frederick H. Gribbell; Russell F. Gribbell

(57) ABSTRACT

A safety shield is provided that protects persons from hot fluids used with cooking pots used for deep frying over an open flame. The safety shield construction includes an adjustable band that attaches to the outside of a cooking pot, and having an outwardly protruding surface to re-direct spilled hot fluids away from a human user standing near the cooking pot. The safety shield provides a safety zone that deflects any spilled hot fluids away from the human user. The safety shield has an overall inverted V-shape, and as an alternative embodiment can have additional somewhat vertical barriers that help to prevent any spilled cooking oil from touching the human user.

19 Claims, 13 Drawing Sheets

(56) References Cited

U.S. PATENT DOCUMENTS

| | | |
|---|---|---|
| 7,044,049 B2 | 5/2006 | Johnston |
| 7,472,698 B1 | 1/2009 | Anibas |
| 7,694,671 B2 | 4/2010 | Lee |
| 7,703,452 B2 | 4/2010 | Repetti |
| 7,707,929 B1 | 5/2010 | Bourgeois |
| 8,020,550 B2 | 9/2011 | Repetti |
| 2005/0229791 A1 | 10/2005 | Wanatosky |
| 2010/0101431 A1 | 4/2010 | Myshrall |
| 2010/0288138 A1 | 11/2010 | Fiorino |

* cited by examiner

FRONT VIEW

REAR VIEW

RIGHT SIDE VIEW

LEFT SIDE VIEW

TOP VIEW

BOTTOM VIEW

UPTURNED PROTRUDING OVERSPILL SHIELD

CROSS-REFERENCE TO RELATED APPLICATIONS

None.

TECHNICAL FIELD

The technology disclosed herein relates generally to safety equipment and is particularly directed to an overspill deflector of the type which protects persons from hot fluids used with cooking pots used for deep frying over an open flame. Embodiments are specifically disclosed as an annular (or cylindrical) band with a conical skirt portion, and having an outwardly protruding "safety shield" structure; the cylindrical band is attached to the outside of a cooking pot. The outwardly protruding safety shield re-directs any hot fluid that might spill over the top of the cooking pot; the safety shield deflects the spilled hot fluid away from a human user who is standing near the cooking pot.

In addition, by deflecting the spilled hot fluid, the safety shield also deflects any overspilling flammable liquid away from the flame below the cooking pot, and therefore, decreases the risk of an accidental fire.

In one embodiment, the safety shield exhibits an inverted V-shape along a portion of the circumference of the cylindrical band and cooking pot, which directs overspilling fluids to the left and right of a "safety zone" where the human user is standing.

In an alternative embodiment, the safety shield still exhibits an inverted V-shape along a portion of the circumference of the cylindrical band, but also includes an upwardly facing barrier along the outer edges of the inverted V-shaped shield. The purpose of this upwardly facing barrier is to further lessen the possibility of any overspilling liquid from flowing onto the human user.

STATEMENT REGARDING FEDERALLY SPONSORED RESEARCH OR DEVELOPMENT

None.

BACKGROUND

Open flame deep fryer pots, as currently designed, pose a significant fire threat. When deep frying food items, such as a turkey, in a pot using flammable liquid over an open flame, there is a danger of the liquid overspilling the pot and coming in contacting with the flame which can cause a fire.

If the hot cooking oil overspills during the cooking or heating process, it typically runs down the edges of the pot and follows the pot's contour until it drips off onto a central portion of the cooking pot where the open flame is located, thereby creating the fire risk. This typically occurs when the food item, a turkey for example, is being placed into the oil to begin the cooking process; if care is not properly observed, the displacement of the food item will cause the oil to overspill. This can occur especially if the food item was not properly thawed and dried first. (Liquid water still on the food item can quickly be turned into boiling water and/or steam, with undesirable results.)

There are several renowned fire prevention organizations that have commented on the dangerous aspects of deep frying over an open flame with the currently designed pots. For example, U.L. (Underwriters Laboratories) does not certify any turkey fryers. "Based on our test findings, the fryers used are not worth the risks. If the cooking pot is overfilled with oil, the oil may spill out of the unit when the turkey is placed into the cooking pot. Oil may hit the burner or flames, causing a fire to engulf the entire unit."

Another example is FEMA and the U.S. Fire Administration (at www.usfa.fema.gov). They state that, "even a small amount of cooking oil spilled on a hot burner can cause a large fire."

A further example is the National Fire Protection Association (NFPA), which "continues to believe that turkey fryers that use cooking oil, as currently designed, are not suitable for safe use. They pose a significant danger that hot oil will be released at some point during the cooking process. The burners that heat the oil can ignite spilled oil."

Nevertheless, these open flame deep fryer pots are becoming more and more numerous, so they are apparently quite popular. Conventional devices known in the prior art include U.S. Pat. No. 1,622,587 (to Housel), which design was to prevent the liquid from extinguishing the flame, rather than preventing a fire. Another convention device includes U.S. Published Patent Application No. 2010/0101421 (Myshrall).

The problem with the designs in these conventional examples is, if the hot oil would overspill, there is a good chance it would spill onto the legs of the nearby person who is cooking, and potentially causing severe burns to that person.

FIG. 1 illustrates an outdoor cooking pot that is known in the prior art, generally designated by the reference numeral 5. The cooking pot 5 has a bottom stand 1, a burner 2, and a cooking chamber 3. The cooking chamber 3 is open at the top, which allows a human user to lower some type of food item into the cooking area using some type of basket or other frame, designated by the reference numeral 4 on FIG. 1.

This conventional cooking pot 5 includes a skirt that is generally designated by the reference numeral 6. If hot cooking oil should happen to spill over the top of a conventional open cooking pot, that hot oil could drain down the outer sides of the pot to the bottom, and then drip down into the open flame at the open flame burner. The skirt 6 prevents that from happening. Unfortunately, usually that cooking oil tends to overspill when a human user is lowering a large food item, such as a turkey, into the cooking chamber area at 3, using the basket 4. When that occurs, if the hot oil spills down the side of the cooking chamber 3 and off the sloped skirt 6, that hot oil will likely drain right onto the legs of the human user, potentially causing a severe burn to that human. This is a basic flaw in the design of the conventional cooking pot 5.

SUMMARY

Accordingly, it is an advantage to provide an overspill deflector for cooking pots that includes a safety shield protrusion that directs fluids away from a portion of the circumference around the cooking pot to provide a spill-free "safety zone" where the human user is standing nearby.

It is another advantage to provide a cylindrical overspill deflector for cooking pots which has a skirt portion that slopes downward and outward, in which a "safety shield" protrusion is formed along a portion of the circumference of the attachment so that fluids are directed away from that portion of the circumference.

It is yet another advantage to provide a cylindrical overspill deflector for cooking pots having a protruding "safety shield" along a portion of the circumference of the attachment, in which the safety shield exhibits an inverted V-shape that re-directs any overspilling fluids to the left and right of the safety shield, and thereby creates a "safety zone" for a human user to stand without overspilling fluid splashing on that user.

It is still another advantage to provide a cylindrical overspill deflector for cooking pots having a protruding "safety shield" along a portion of the circumference of the attachment, in which the safety shield re-directs any overspilling fluids to the left and right of the safety shield, and also exhibits an upwardly facing barrier that is mounted along the outer edges of the protruding safety shield. This alternative embodiment again creates a "safety zone" for a human user to stand without overspilling fluid splashing on that user.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, overspill deflector for use with cooking pots is provided, which comprises: a band portion that is substantially cylindrical, said band portion having a first circumference at a first upper edge that is substantially circular, said band portion extending downward from said first upper edge; a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference; and a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion.

In accordance with another aspect, attachment for use with cooking pots is provided, which comprises: a band portion that is substantially cylindrical, said band portion having a first circumference at a first upper edge that is substantially circular, said band portion extending downward from said first upper edge, said band portion having an adjustable fastener to tighten said band around an outer surface of a cooking pot; a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference, said increasing outer diameter re-directing a fluid that overspills said cooking pot and runs down said band portion and said skirt portion such that said re-directed fluid does not drip into a central portion of a combination of said cooking pot and said attachment; and a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion, said protruding safety shield re-directing an overspilling fluid away from a safety zone that is proximal to a portion of said second circumference of said skirt portion where said safety shield is located.

In accordance with yet another aspect, overspill deflector for use with cooking pots is provided, which comprises: a substantially annular structure that includes an adjustable fastener for mounting to an outer surface of a cooking pot, said annular structure, when mounted, wrapping completely around said outer surface of said cooking pot and increasing in outer diameter as said annular structure extends downward, said substantially annular structure being substantially liquid-tight with respect to cooking oils; and a safety shield that is mounted along a portion of an outer surface of said annular structure, said safety shield protruding outward from said annular structure, said safety shield being substantially liquid-tight with respect to cooking oils, said safety shield having a proximal end that makes physical contact with said annular structure and having a distal end at an opposite, free end of the safety shield protrusion.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
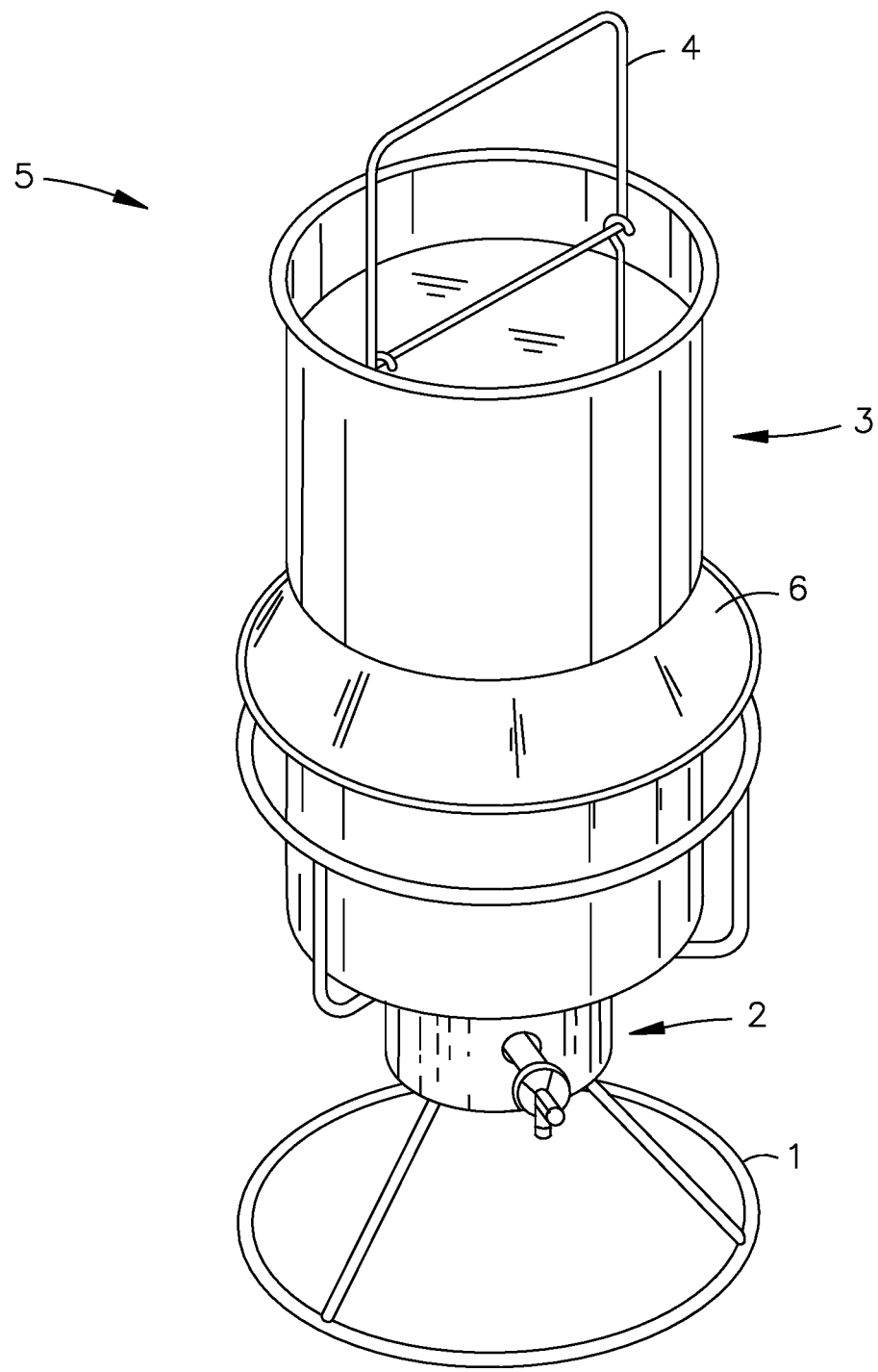
FIG. 1 is a perspective view of a conventional outdoor cooking pot with a gas burner, known in the prior art.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

A "safety shield" apparatus is provided that includes a thin, cylindrical ring, preferably made of sheet metal, with an outwardly protruding barrier that also faces downwardly. The safety shield apparatus is designed to be mounted to the outer diameter of a cooking pot. The cylindrical ring is divided at one point along its circumference, to allow an overlap, so the ring can be adjusted in inner diameter to accommodate a variety of styles and sizes of cooking pots. In an exemplary arrangement, the ring includes some type of fastening device, such as a latch, clamp, screw, or another similar type of adjustable fastener. It is preferred for this fastener to be adjustable in size, in order to be fitted tightly and securely around various diameter pots.

In a preferred embodiment, the ring has a substantially cylindrical band portion that wraps tightly around the cooking pot's outer diameter, and the ring also has a skirt portion that increases in outer diameter. This skirt portion is designed to prevent overspilling fluid from draining down and toward the center of the cooking pot; without this feature, the overspilling fluid could drip directly into the open flame that is being used to heat the cooking pot, which can quickly start a grease fire.

Unfortunately, such an apparatus with a skirt portion, without more structure, can also direct hot fluid directly onto a human user who is standing nearby, thereby burning the legs and feet of that human user. Therefore, in a preferred embodiment, a protruding "safety shield" portion is provided to direct any overspilling fluids both to the right and to the left, and thus away from a portion of the circumference around the cooking pot, and thereby creating a "safety zone" for where the human user is standing. This safety zone is the area where a person would typically stand while adding or removing the food item to be cooked into or from the cooking pot of hot oil.

This safety shield feature thus provides an area around the circumference of the cooking pot where the hot oil would be deflected away and to the sides of the person doing the cooking (the human user) in the event of an overspill, rather than having that oil directly spilled onto them. This design substantially decreases the chances of starting a fire or receiving burns in the event of an accidental overspill of hot cooking oil. The safety shield protrusion can be of virtually any desirable shape, so long as that shape will re-direct the overspilling fluid away from the human user's position.

In one preferred embodiment, the safety shield protrusion has an approximate shape that appears like an inverted "V", so that the overspilling fluid is prevented from running straight down the sides of that portion of the circumference of the cooking pot; instead, the inverted V-shape of the protruding safety shield re-directs fluids at that portion of the arcuate circumference (i.e., the perimeter) of the cooking pot along the inverted V-shaped surfaces, so that these fluids will drip down to the floor level at positions to either side of the "safety zone" where the human user is standing.

In an alternative preferred embodiment, the safety shield protrusion includes the V-shaped surfaces described in the previous paragraph, but also includes an upwardly facing barrier along its outside edges. The purpose of this upwardly facing barrier is to further lessen the possibility of any overspilling liquid from overspilling onto the human user.

Figure 2:
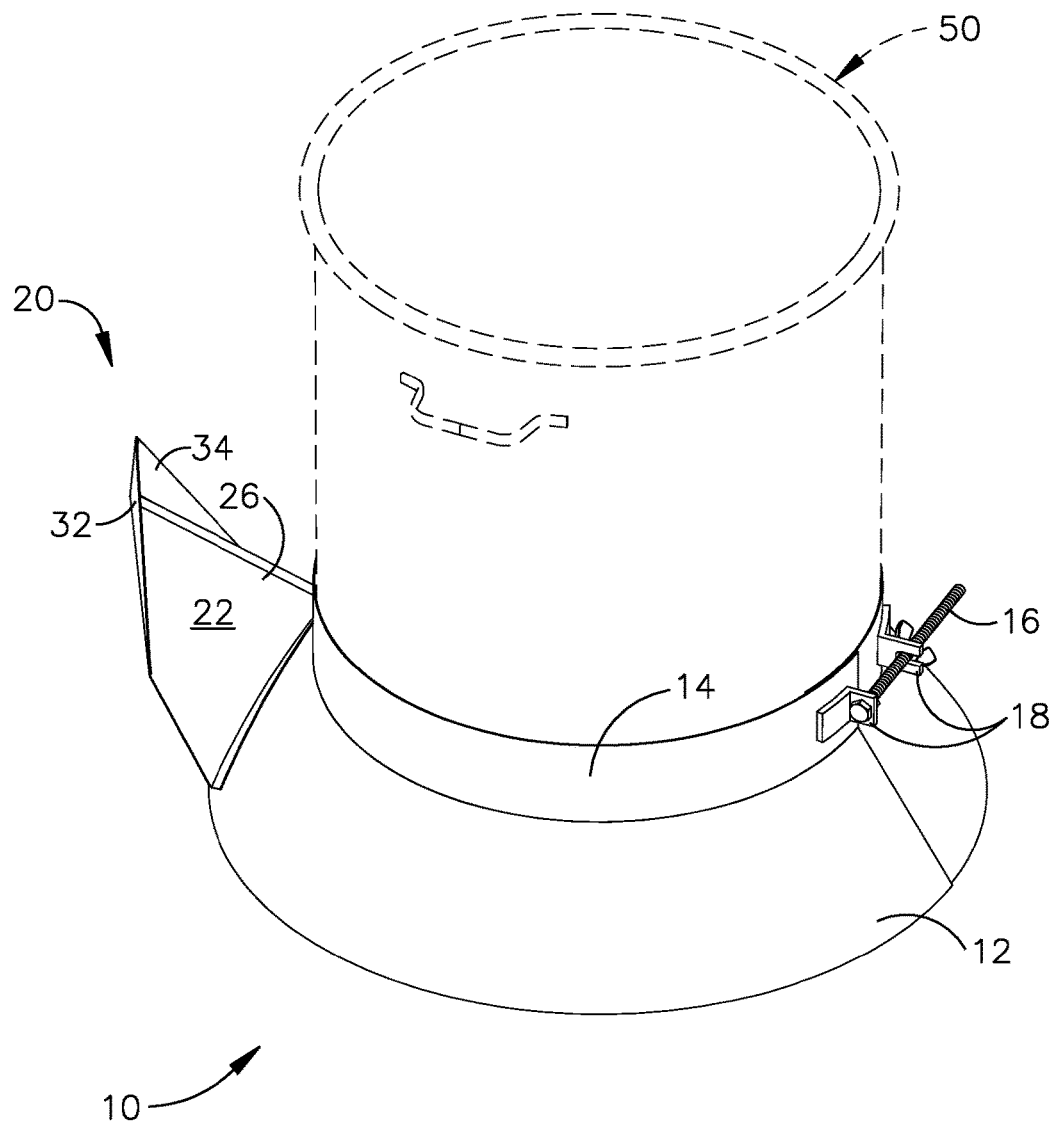
FIG. 2 is a perspective view of a tightening band with an outward deflecting protrusion and with a first embodiment of a safety shield, as constructed according to the principles of the technology disclosed herein.

Referring now to FIG. 2, an overspill deflector, generally designated by the reference numeral 10, has a "safety shield" 20 that is constructed according to the principles of the technology disclosed herein. The upper portion 14 comprises a band that is to be placed around the outer perimeter of a cooking pot, which is illustrated at the reference numeral 50. The wrap-around band 14 can be tightened using any conventional method of attachment, and in FIG. 2, there is a pair of protruding flanges 18 (having an opening), with a long bolt 16 that, when tightened, will pull the two flanges 18 together. Once the overspill deflector 10 is sufficiently tightened, the substantially cylindrical portion 14 will remain mounted to the outer perimeter of the cooking pot 50.

The substantially cylindrical band portion 14 has a skirt-like portion 12 attached or formed at the bottom circumference of the band portion 14. As can be seen in the elevational views, such as the view of FIG. 7, this skirt-like portion 12 represents a conical section that is narrower at its top portion than it is at its bottom portion. This conical section portion 12 will tend to deflect and re-direct any spilled cooking oil down and away from a central portion of the combination of the cooking pot 50 and overspill deflector 10. This prevents the cooking fluid from dripping into that central portion, where the cooking flame is located, for the pot 50.

As discussed above in the BACKGROUND OF THE INVENTION, if hot oil is splashed down the sides and then diverted away from the center of the cooking pot, that hot oil could end up spilling onto the legs of a human user who is standing nearby. This is prevented by the present technology, which creates a spill-free "safety zone" around a portion of the perimeter of the cooking pot, near the area of a safety shield protrusion that is generally designated by the reference numeral 20. This safety shield protrusion 20 is affixed or attached to the conical section (or skirt-like) portion 12 that extends downward and outward, and that portion 12 is affixed or attached to the substantially cylindrical band portion 14.

The safety shield protrusion 20 includes a portion that approximates an inverted V-shape that is made up of two sloped substantially planar portions 22 and 24 (see all of the views in FIGS. 2-11), in which these two planar portions 22 and 24 meet at an upper edge or seam 26. As can be seen particularly in FIG. 6, this inverted V-shape will deflect the hot oil away from a portion of the area around the circumference of the overall overspill deflector 10, which will thereby keep the hot oil from spilling onto the legs or feet of the nearby human user. Another way of describing the safety shield protrusion 20 is that its shape re-directs fluids both to the left and to the right, and that re-direction of fluids creates a "safety zone" for the human user.

An additional feature in this first embodiment of FIGS. 2-11 will assist in preventing hot fluids from spilling onto a nearby human user. As can be best seen in FIGS. 4 and 8, this first embodiment safety shield protrusion 20 includes an additional barrier that will tend to further prevent the hot oil from splashing onto a human user; the additional barrier comprises surfaces at 32 and 34 that are affixed or attached to the planar surfaces 22 and 24, respectively. These barriers 32 and 34 also come to a meeting edge or seam at 36 (see FIG. 6 for details).

The barriers 32 and 34 extend in a somewhat vertical direction from the distal end of the planar surfaces 22 and 24, respectively. These somewhat or near-vertical barriers 32 and 34 will further obstruct or deflect any spilling oil that might happen to be coming down the outer perimeter of the cooking pot 50.

It will be understood that the overspill deflector 10 can, alternatively, be constructed as a permanent portion of the cooking pot 50, if desired. Such permanent construction would, of course, not need any tightening mechanism or fastener to hold the overspill deflector 10 to the outer surface of the pot 50. The overall appearance of such a permanent construction would likely be approximately the same as that depicted on FIG. 2, but without the flanges 18 and tightening screw 16 that make up the tightening mechanism that is illustrated in FIG. 2, and in other figures herewith.

Figure 3:
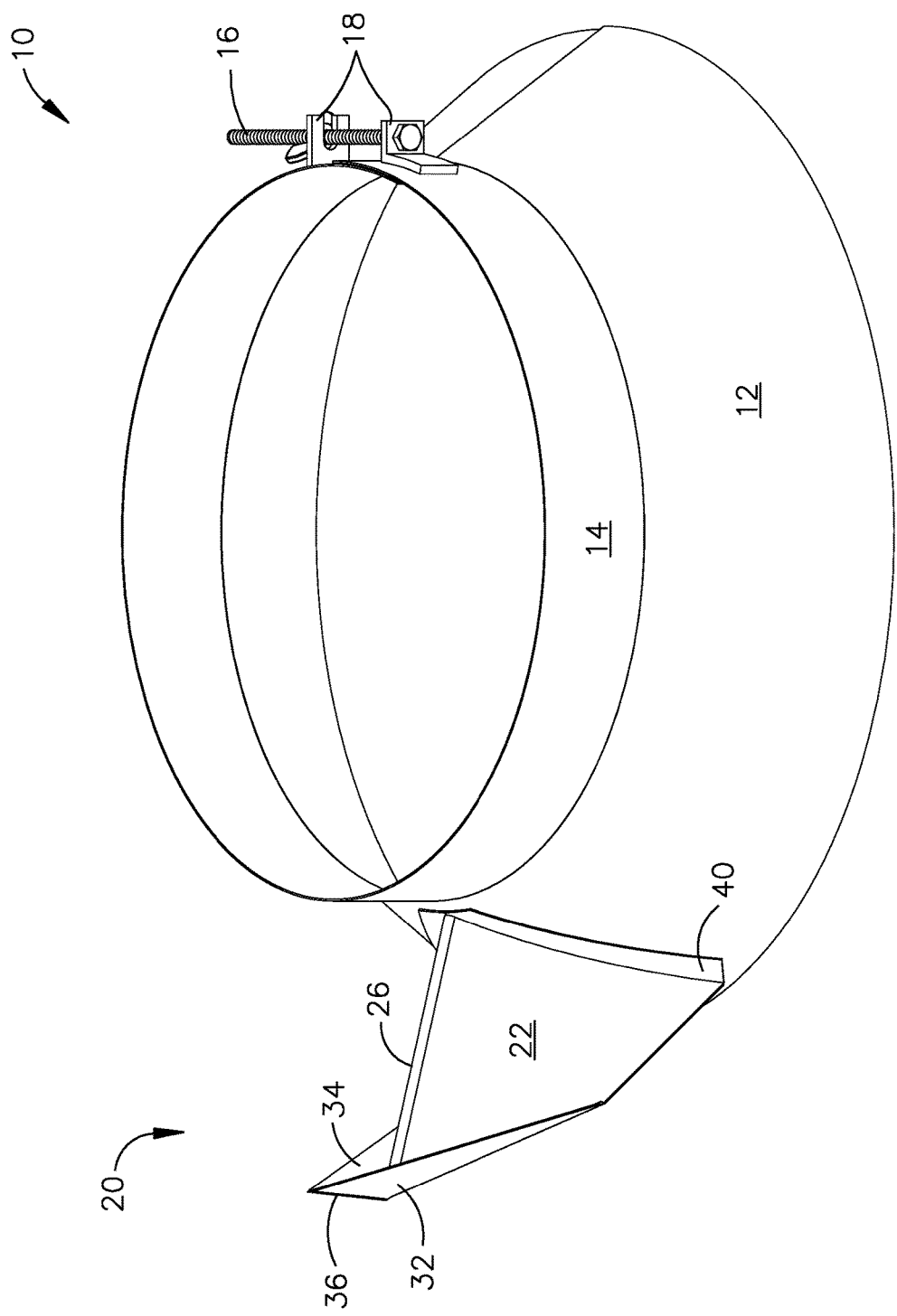
FIG. 3 is a perspective view from the side and from above of the safety shield band of FIG. 2.
Figure 4:
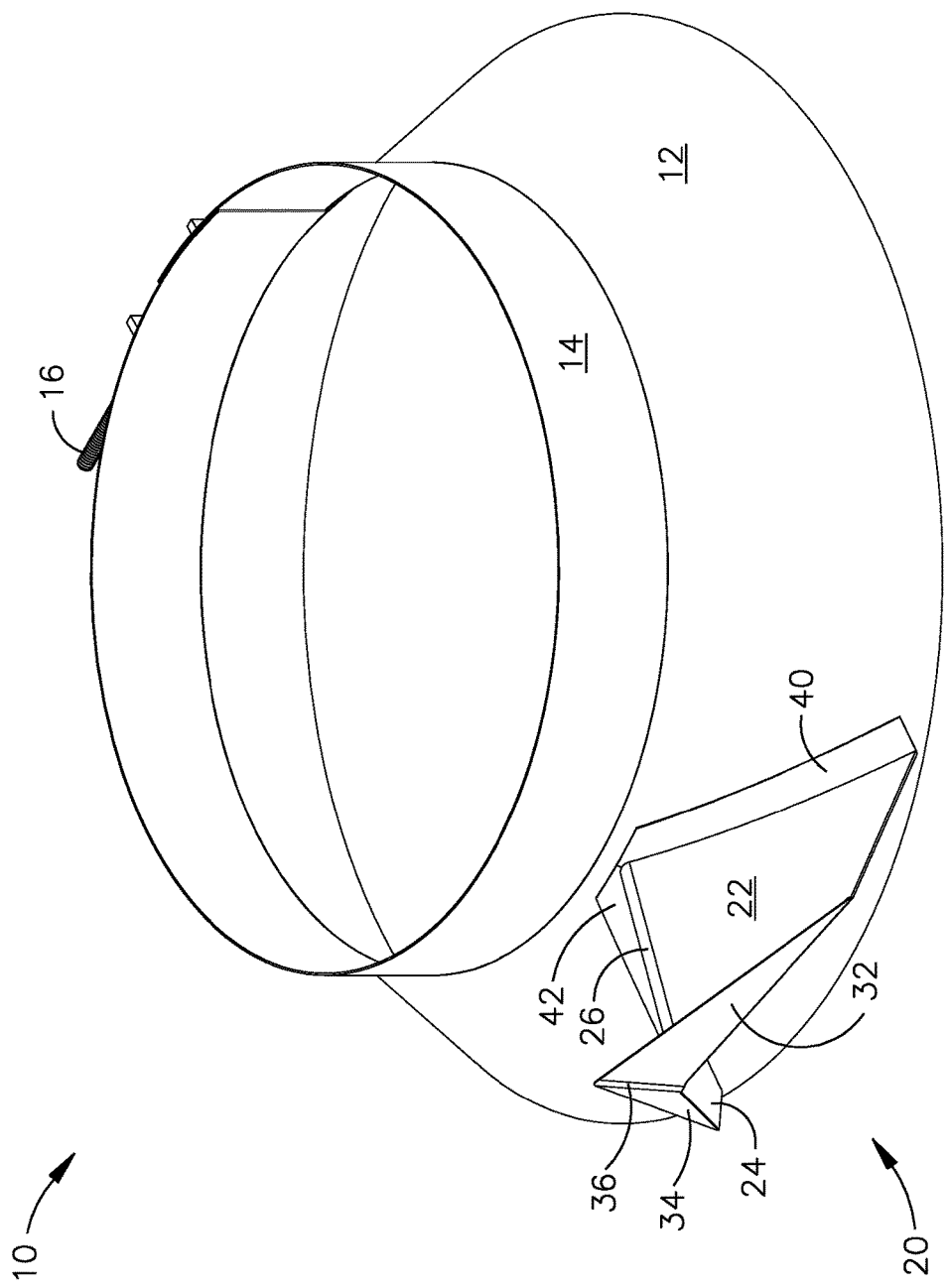
FIG. 4 is a perspective quarter view from the front, right side, and above of the safety shield construction of FIG. 2.
Figure 5:
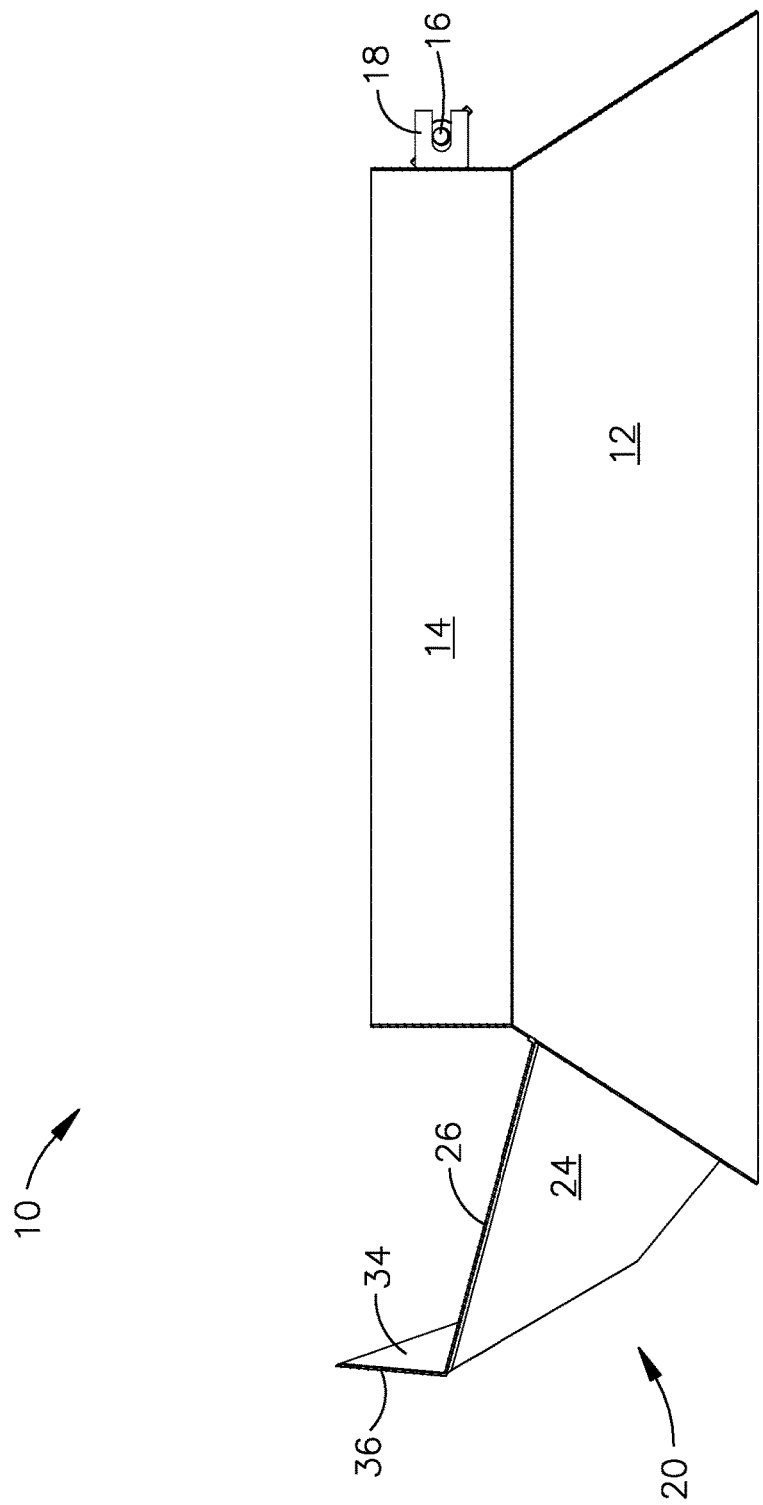
FIG. 5 is a section view of the safety shield construction of FIG. 2, taken along the line 5-5 on FIG. 10.
Figure 6:
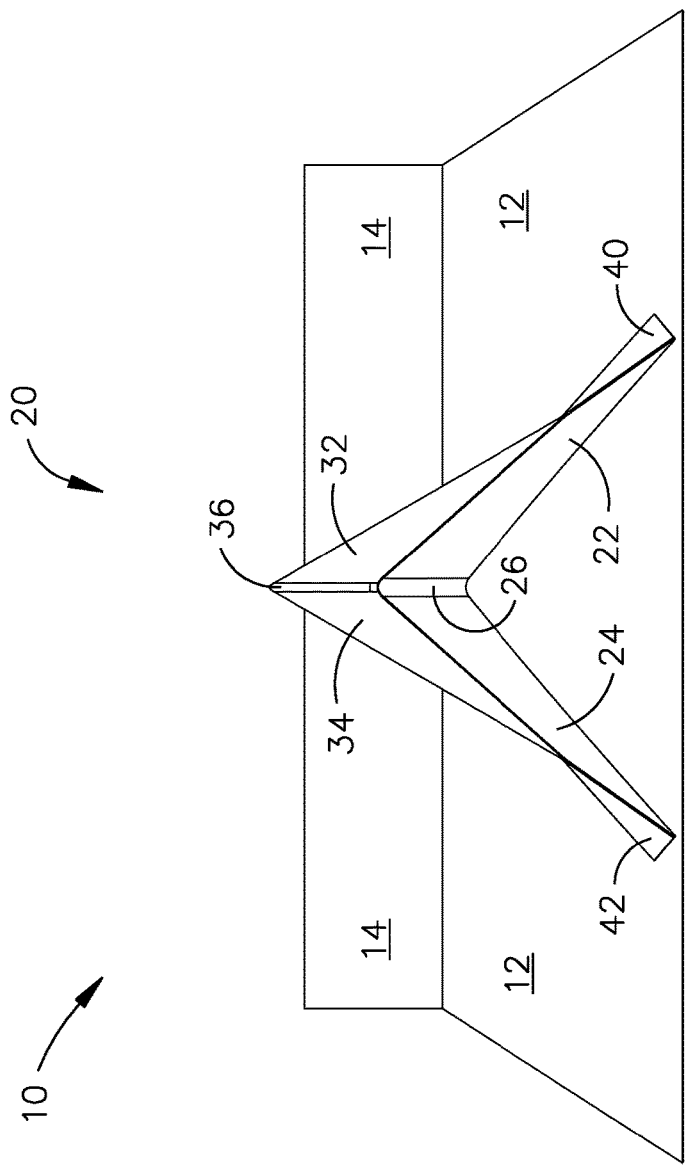
FIG. 6 is a front elevational view of the safety shield construction of FIG. 2.
Figure 7:
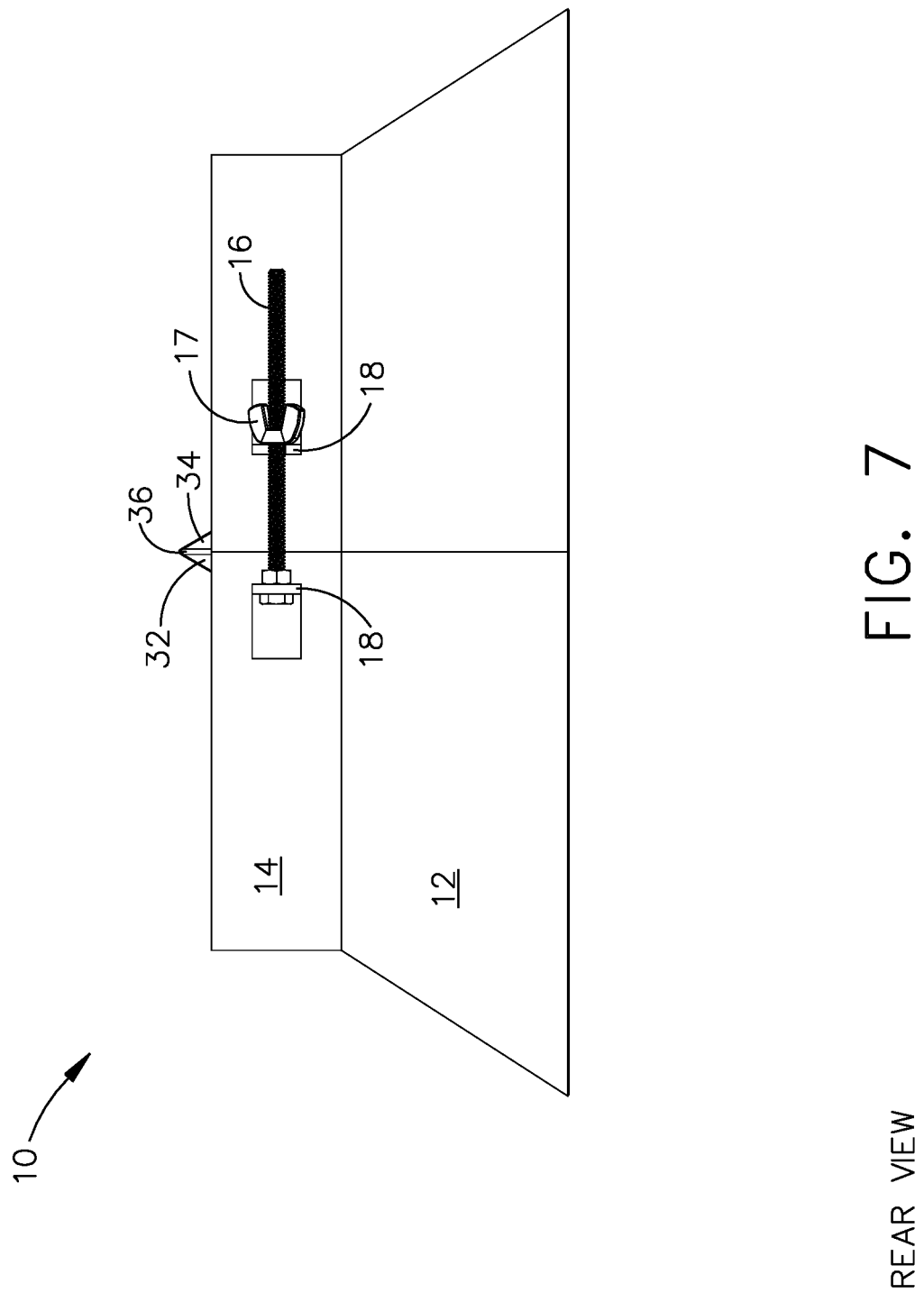
FIG. 7 is a rear elevational view of the safety shield construction of FIG. 2.
Figure 8:
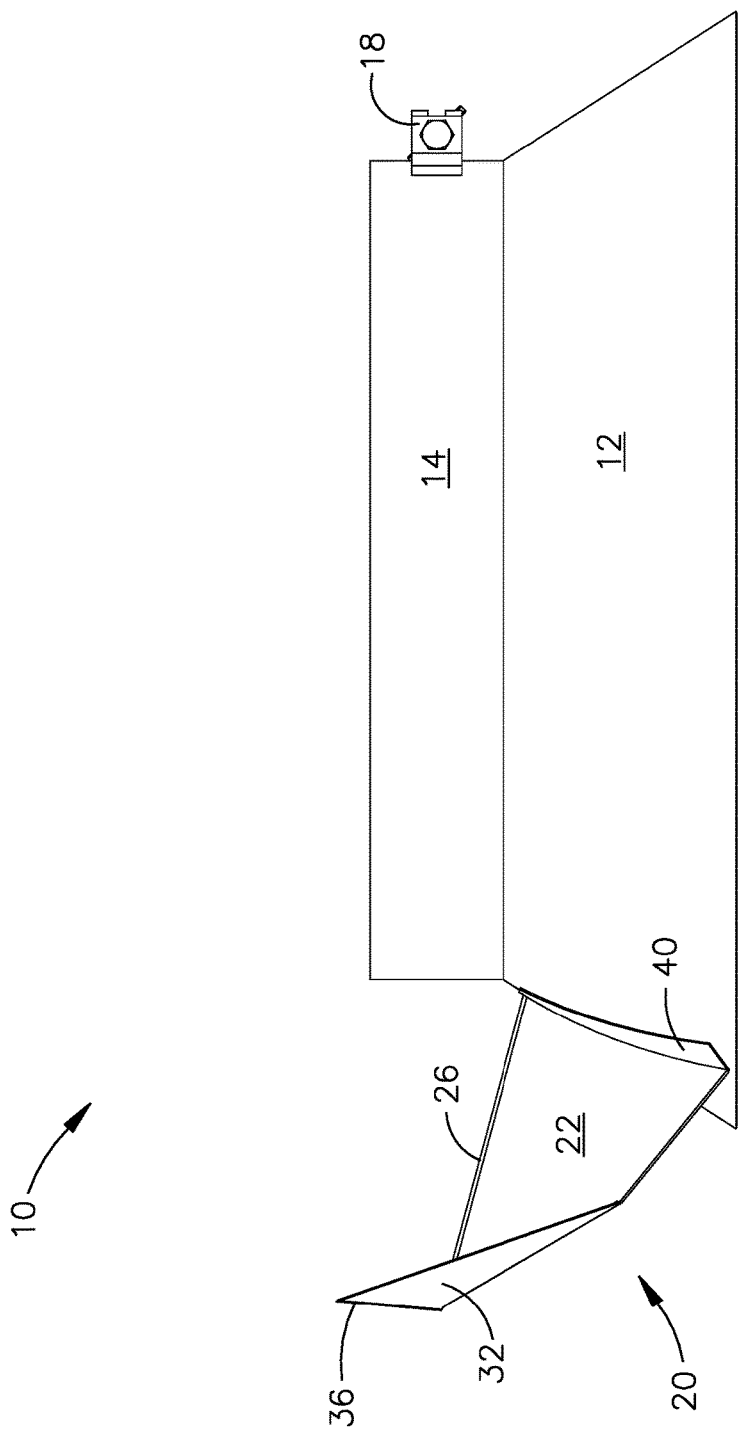
FIG. 8 is a right side elevational view of the safety shield construction of FIG. 2.
Figure 9:
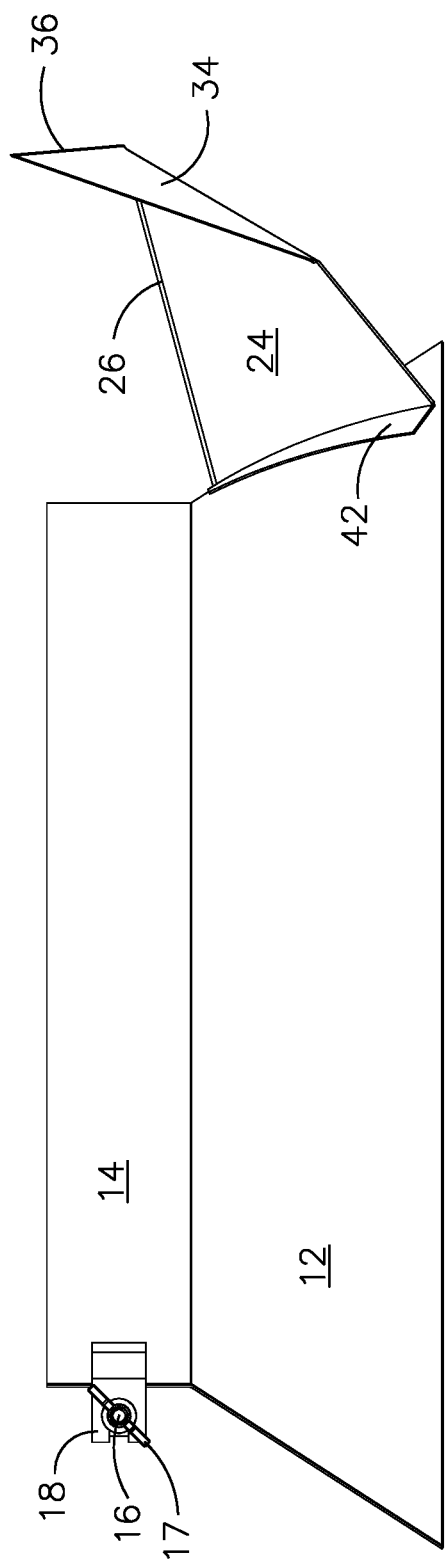
FIG. 9 is a left side elevational view of the safety shield construction of FIG. 2.

Additional details of this construction can be seen on FIG. 3, for example, in which there is a supporting flange 40 that is part of the structure of the planar surface 22. There is a similar supporting flange structure 42 that is attached to the planar surface 24, which can be seen on FIG. 4, for example. FIG. 5 is a section view that shows some of the details of the shape of the planar surface 24 in better detail. FIG. 6 is a front elevational view that shows the details of the shapes of the near-vertical barriers 32 and 34, for example. FIG. 7 is a rear elevational view that shows details of the tightening mechanism, which includes a long bolt 16 and a wing nut 17, as well as the two flanges 18 that are pulled together as the wing nut 17 is tightened along the screw threads 16.

Figure 10:
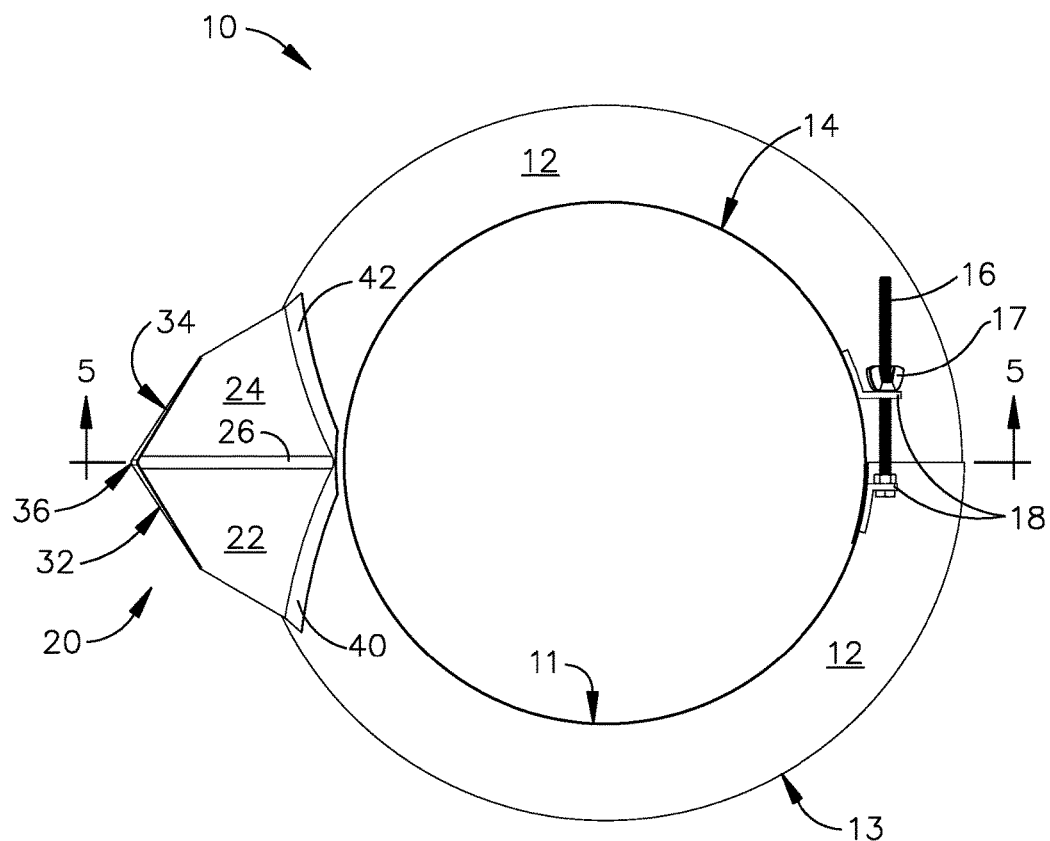
FIG. 10 is a top plan view of the safety shield construction of FIG. 2.
Figure 11:
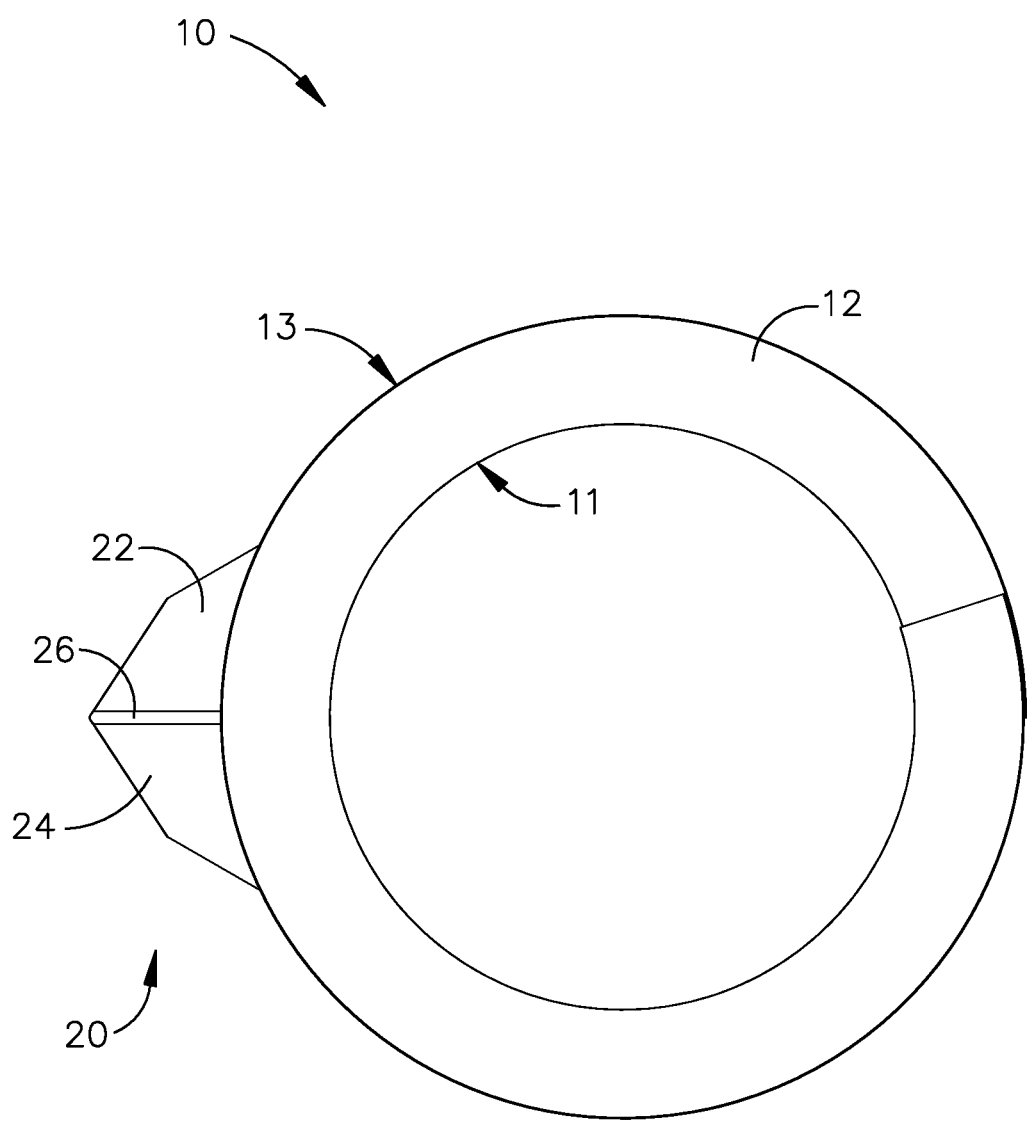
FIG. 11 is a bottom plan view of the safety shield construction of FIG. 2.

FIG. 10 is a top plan view that shows the details of the outer and inner circumferences of the overall structure of the overspill deflector 10. In this view, the substantially cylindrical band portion 14 appears as a circle, and the inner diameter of the conical section portion 12 has the same overall diameter at 11 as that of the band 14. The outer diameter of the conical section portion 12 is illustrated at 13. The flange portions 40 and 42 can be seen as curved surfaces that adjoin the two planar portions 22 and 24, which in turn are joined by an edge or a small inverted V-shaped seam at 26 that holds the two planar portions 22 and 24 together in a liquid-tight arrangement. Also on FIG. 10, the upward extending barriers 32 and 34 appear mainly as thick lines in this view, which are adjoined at an edge 36.

It will be understood that the surfaces 22, 24, 32, and 34 can be of any size and shape so as to provide the sloped structures and the "shield" or "safety" area that is provided by this type of structure, without departing from the principles of the technology disclosed herein. In addition, the proportion of arcuate coverage of the safety shield surfaces 22 and 24 (and 32, 34) around the perimeter (circumference) of the skirt portion 12 can be increased or decreased as compared to the illustrated embodiments, without departing from the principles of the technology disclosed herein, although it probably would be undesirable to construct a safety shield that covers 100% of the perimeter—that would create more of a "moat" effect, and if that "moat" structure would overspill, then the hot oil could perhaps spill over any portion of the perimeter at an uncontrolled location (and thereby, not create a "safety zone" after all). It is preferred that these components are all made of some type of metal material, so as to withstand the rigors of use and also to withstand the hot oils that are typically used in these outdoor cooking pots, in case that oil overspills, which unfortunately occurs more often than desired. It is also preferred that the seams at 26 and 36 are to be made liquid-tight with respect to cooking oils, so as to prevent any spilled oil from leaking through and ending up in the "safety zone" that is being created by the use of this structure 20.

The construction of these parts can be as elegant as desired, including a welded construction. A more cost-effective construction technique would probably be to use folded metal parts that are stamped to the proper sizes and shapes and bent; and then, if necessary, to have a small V-shaped piece run along the adjoining seam, between the two planar pieces 22 and 24, for example. Further, the planar pieces 22 and 24 could be constructed as a single piece, and then bent at a fold line at 26; also the barriers 32 and 34 could likewise be constructed as a single piece, and then bent at a fold line at 36.

Figure 12:
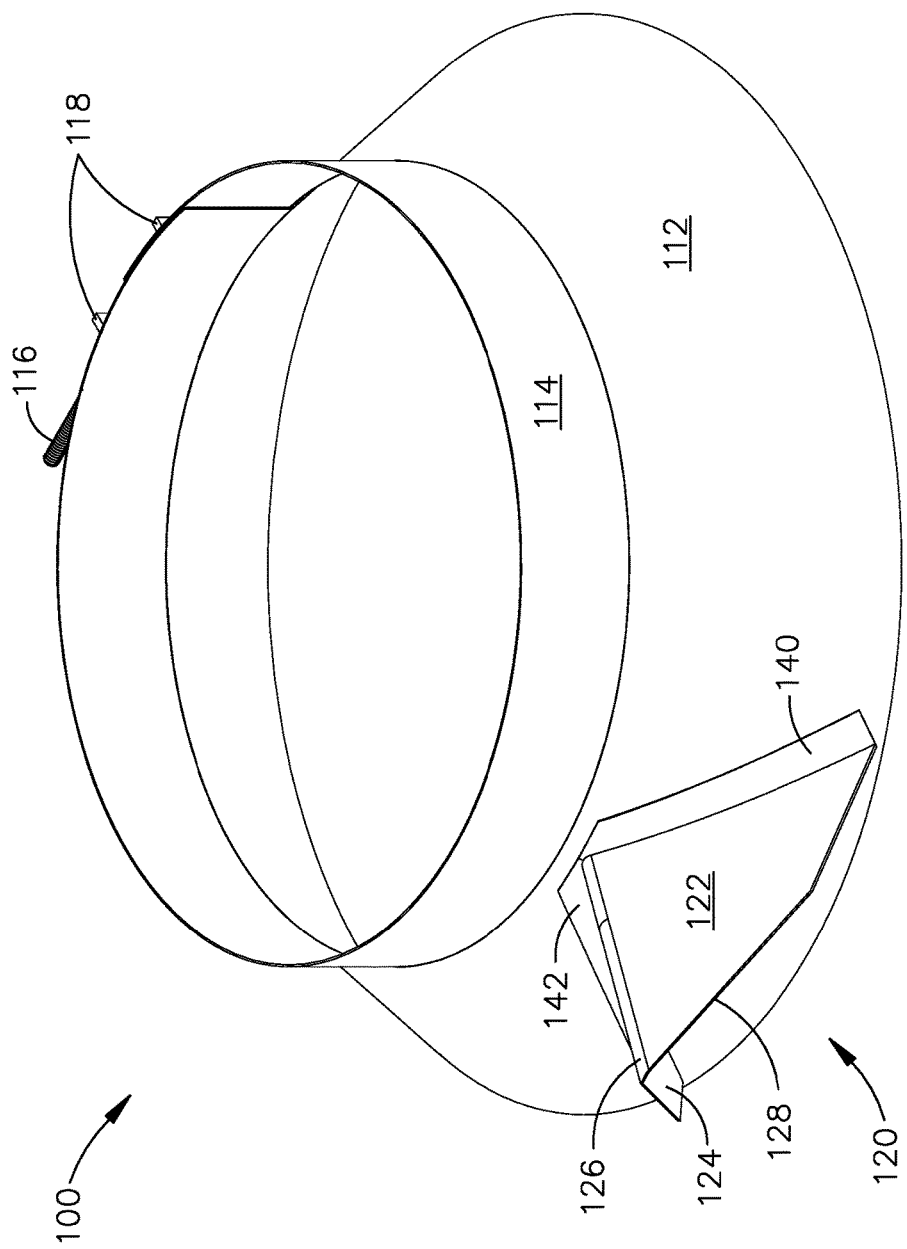
FIG. 12 is a perspective quarter view from the right side, front, and above of a second embodiment safety shield construction of a band and outward extending skirt with a simplified construction of a safety shield, as constructed according to the principles of the technology disclosed herein.

Referring now to FIG. 12, a second embodiment of an overspill deflector construction is illustrated, generally designated by the reference numeral 100. The safety shield protrusion is generally designated at the reference numeral 120, and is affixed or attached to a conical section or skirt-like portion 112 that extends downward and outward, and that portion 112 is affixed or attached to a substantially cylindrical band portion 114. The band portion 114 is essentially the same type of device as the band 14 that is depicted in the earlier figures for the first embodiment 10.

The safety shield protrusion 120 includes a planar piece 122 and a planar piece 124 that are attached to the conical section portion 112 by flanges 140 and 142, respectively, at a proximal end of the protrusion 120. The safety shield protrusion 120 also has a distal end 128 at an opposite, free end of the protrusion 120.

The two planar surfaces 122 and 124 meet at a fold line or seam 126. As described above, this construction for the seam 126 could be welded, if desired; or there could be a small inverted V-shaped piece of material that covers along the edge of the seam that joins the two planar surfaces 122 and 124. Any other conventional or even unconventional construction technique could be used to create these structures, which would be within the principles of the present technology disclosed herein.

The two planar surfaces 122 and 124 could be of the same size and shape as the planar surfaces 22 and 24 of the first embodiment, if desired. Or perhaps the planar surfaces 122 and 124 of this second embodiment could be designed so that they point upward (the "V"-shape) by a greater distance, so as to provide more of a vertical deflection surface, if desired. In any event, if hot cooking oil would happen to overspill the cooking pot 50, and then drain down the outer edges of that pot and thereby end up draining down the outer surface of the band 114 and the conical section surface 112, the shield protrusion 120 will deflect that cooking oil by virtue of the two planar surfaces 122 and 124. This creates a safety zone for the human user who would be standing nearby the safety shield protrusion 120. This is a simplified construction, which would be less expensive to produce than the more complex construction of the first embodiment 10.

Figure 13:
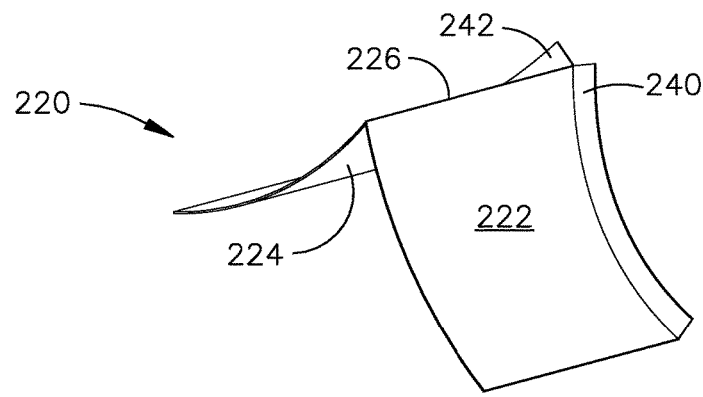
FIG. 13 is a perspective view of a safety shield alternative construction, in which the safety shield protrusion comprises an inverted V-shape using curved surfaces, for the safety shield construction of FIG. 12.
Figure 14:
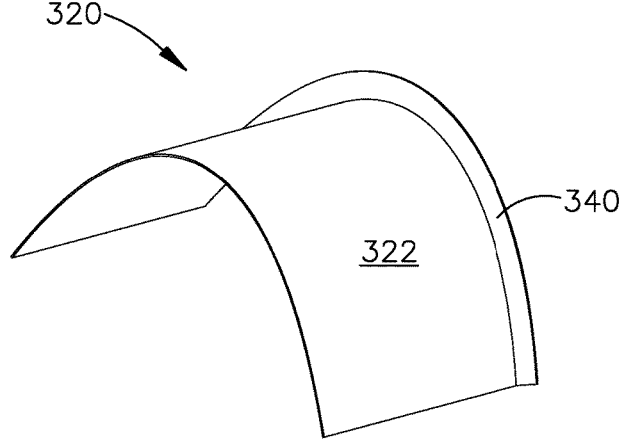
FIG. 14 is a perspective view showing an alternative construction of the safety shield protrusion in which the safety shield is curved in an inverted U-shape, of the safety shield construction of FIG. 12.
Figure 15:
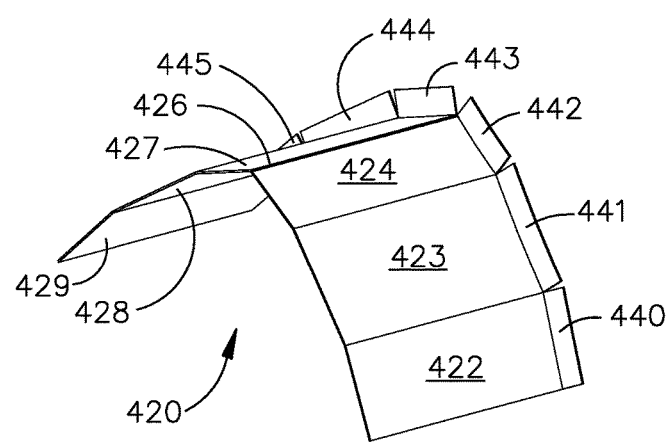
FIG. 15 is a perspective view of another alternative construction of the safety shield protrusion, in which the safety shield protrusion comprises multiple segmented sections that create an inverted overall V-shape, of the safety shield construction of FIG. 12.

The protruding "safety shield" structures 20 and 120 and described above, could be modified without departing from the principles of the technology disclosed herein. FIGS. 13, 14, and 15 show exemplary variations in shape for such safety shield constructions. In FIG. 13, the safety shield protrusion is generally designated by the reference numeral 220, and includes a curved surface 222 and a similar curved surface 224. These curved surfaces are adjoined along a seam line 226, and are attached to the conical section 112 (or 12 if desired) by a pair of flanges 240 and 242, respectively.

Referring now to FIG. 14, a safety shield protrusion 320 is illustrated as having a curved shield surface at 322. This could be a continuous curve, as illustrated in FIG. 14. This curve will deflect any hot oils down and to the sides, thereby creating a "safety zone" for the nearby human user. The curved member 322 is attached to the conical portion 12 or 112 by a flange 340.

Referring now to FIG. 15, yet another alternative design is illustrated for a safety shield structure, generally designated by the reference numeral 420. This is a segmented design with multiple planar surfaces that each are adjoined by some type of seam or fold line. The segments are designated by the reference numerals 422, 423, 424, 426, 427, 428, and 429. The top two segments 424 and 427 have an upper seam line at 426, which is to be a liquid-tight seam. All the other seams between each segment would also be liquid-tight, or more likely the individual segments could all be part of a single sheet of metal material that has been bent into these individual segments. In that situation, the top seam 426 may not be literally a seam between two separate pieces of metal being adjoined, but could merely be a bend in a single sheet of metal that makes up the entire safety shield structure 420. There are flanges adjoining the segments at 440, 441, 442, 443, 444, and 445, respectively. These flanges are used to attach the safety shield protrusion 420 to the conical section 12 (or 112), as desired.

It will be understood that the phrase, a "safety shield exhibiting a shape that approximates an inverted V," refers not only to the shape that is illustrated in FIG. 6 for the planar pieces 22 and 24 (which are substantially the same shapes as the planar pieces 122 and 124 on FIG. 12), but this phrase also refers to the alternative embodiment shapes illustrated in FIGS. 13, 14, and 15. More specifically, the curved shield surfaces 222 and 224 on FIG. 13 form a shape that approximates an inverted V; the curved shield surface 322 forms a shape that approximates an inverted V (even though it also approximates an inverted "U"); and the segmented shield surfaces 422, 423, 424, 426, 427, 428, and 429 form a shape that approximates an inverted V. In essence, any geometric shape that re-directs fluid both to the left and to the right could, in some sense, be said to approximate an inverted V, even if that geometric shape, for example, was a circle—the top half of the circle would be quite similar to the U-shape depicted in the embodiment of FIG. 14.

It will also be understood that another alternative shape for a safety shield could use only one-half the protruding structure that is illustrated in the figures herewith. In other words, instead of a V-shape for the safety shield of FIG. 6, one could construct the overspill deflector using a line-shaped protruding member that exhibits a single slope, such as the planar member 22, but without the planar member 24. This sort of simplified structure would tend to re-direct the fluids in only a single direction (i.e., to the right only); however, if the planar member 22 were to be extended to twice its length, then the "safety zone" formed thereby would be approximately the same size. Note, however, that this "single slope" concept should not be taken too far: the uppermost edge of such a single sloped planar member 22 would likely have some of the hot fluid drip down and along the bottom surface of the planar member 22 from that top edge, and thus, might leak down into the purported "safety zone," after all. One advantage of the inverted V-shape illustrated in FIG. 6 is that the overspilling hot fluid is always divided into two directions (left and right) and, therefore, if any of that hot fluid should tend to drip down an edge, it will already be flowing away from the "safety zone" and, thus, it will not tend to drip into the established "safety zone."

Furthermore, it will be understood that the structure referred to as the "upturned barrier" formed by the shield members 32 and 34 on FIG. 6 can also be added to the alternative embodiment safety shields that are illustrated in FIGS. 13, 14, and 15, without departing from the principles of the technology disclosed herein. In other words, a similar "upturned barrier" can readily be added to the distal end of the curved shield surfaces 222 and 224 on FIG. 13; a similar "upturned barrier" can readily be added to the distal end of the curved shield surface 322 on FIG. 14; and a similar "upturned barrier" can readily be added to the distal end of the segmented shield surfaces 422, 423, 424, 426, 427, 428, and 429 on FIG. 15. In essence, any geometric shape for a safety shield that re-directs fluid to form a "safety zone" around a portion of the cooking pot's perimeter could have an "upturned barrier" readily added to the distal end of that safety shield and, therefore, fall within the scope of the teachings being disclosed herein.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An overspill deflector for use with cooking pots, said overspill deflector comprising:
    a substantially annular structure that includes an adjustable fastener for mounting to an outer surface of a cooking pot, said annular structure, when mounted, wrapping completely around said outer surface of said cooking pot and increasing in outer diameter as said annular structure extends downward, said substantially annular structure being substantially liquid-tight with respect to cooking oils; and
    a safety shield that is mounted along a portion of an outer surface of said annular structure, said safety shield protruding outward from said annular structure, said safety shield being substantially liquid-tight with respect to cooking oils, said safety shield having a proximal end that makes physical contact with said annular structure and having a distal end at an opposite, free end of the safety shield protrusion, and an upturned barrier portion that extends in a somewhat vertical direction from said distal end of said safety shield.

2. The overspill deflector of claim 1, wherein said safety shield is shaped so as to re-direct a fluid that runs down an outer surface of said skirt portion, said fluid being re-directed both to the left and to the right such that a safety zone is established proximal to said safety shield.

3. The overspill deflector of claim 1, wherein said safety shield comprises a substantially rounded inverted U-shape.

4. The overspill deflector of claim 1, wherein said safety shield comprises a plurality of planar portions that create planar segments, in which a left-most planar segment extends to another planar segment to the right, until reaching a right-most planar segment.

5. An overspill deflector for use with cooking pots, said overspill deflector comprising:
    a band portion that is substantially cylindrical, said band portion having a first circumference at a first upper edge that is substantially circular, said band portion extending downward from said first upper edge;
    a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference; and
    a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion, and an upturned barrier portion that extends in a somewhat vertical direction from said distal end of said safety shield.

6. The overspill deflector of claim 5, wherein said safety shield is shaped so as to re-direct a fluid that runs down an outer surface of said skirt portion, said fluid being re-directed both to the left and to the right such that a safety zone is established proximal to said safety shield.

7. The overspill deflector of claim 5, wherein said safety shield comprises a substantially rounded inverted U-shape.

8. The overspill deflector of claim 5, wherein said safety shield comprises a plurality of planar portions that create planar segments, in which a left-most planar segment extends to another planar segment to the right, until reaching a right-most planar segment.

9. The overspill deflector of claim 5, further comprising:
    an adjustable fastener mounted to said band portion that allows said band portion to be mounted to an outer surface of a plurality of different styles of cooking pots having various sizes of outer diameter.

10. An overspill deflector for use with cooking pots, said overspill deflector comprising:

a band portion that is substantially cylindrical, said band portion having a first circumference at a first upper edge that is substantially circular, said band portion extending downward from said first upper edge;

a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference; and a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion;

wherein said safety shield comprises a first planar portion and a second planar portion, said first planar portion makes up a left portion of an inverted V-shape and said second planar portion makes up a right portion of said inverted V-shape.

11. The overspill deflector of claim 10, further comprising: an upturned barrier portion that extends in a somewhat vertical direction from said distal end of said safety shield.

12. An attachment for use with cooking pots, said attachment comprising:

a band portion that is substantially cylindrical, said band portion having a first circumference at a first upper edge that is substantially circular, said band portion extending downward from said first upper edge, said band portion having an adjustable fastener to tighten said band around an outer surface of a cooking pot;

a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference, said increasing outer diameter re-directing a fluid that overspills said cooking pot and runs down said band portion and said skirt portion such that said re-directed fluid does not drip into a central portion of a combination of said cooking pot and said attachment; and a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion, said protruding safety shield re-directing an overspilling fluid away from a safety zone that is proximal to a portion of said second circumference of said skirt portion where said safety shield is located, and an upturned barrier portion that extends in a somewhat vertical direction from said distal end of said safety shield.

13. The attachment of claim 12, wherein said safety shield is shaped so as to re-direct a fluid that runs down an outer surface of said skirt portion, said fluid being re-directed both to the left and to the right such that a safety zone is established proximal to said safety shield.

14. The attachment of claim 12, wherein said safety shield comprises a substantially rounded inverted U-shape.

15. The attachment of claim 12, wherein said safety shield comprises a plurality of planar portions that create planar segments, in which a left-most planar segment extends to another planar segment to the right, until reaching a right-most planar segment.

16. An attachment for use with cooking pots, said attachment comprising:

a band portion that is substantially cylindrical, said band portion having a first circumference at a first upper edge that is substantially circular, said band portion extending downward from said first upper edge, said band portion having an adjustable fastener to tighten said band around an outer surface of a cooking pot;

a skirt portion that exhibits a shape of a substantially conical section, said skirt portion having a second circumference at a second lower edge that is substantially circular, said skirt portion extending downward from said band portion toward said second lower edge, said skirt portion increasing in outer diameter such that said second circumference is greater than said first circumference, said increasing outer diameter re-directing a fluid that overspills said cooking pot and runs down said band portion and said skirt portion such that said re-directed fluid does not drip into a central portion of a combination of said cooking pot and said attachment; and a safety shield that protrudes from said skirt portion, said safety shield being mounted along a portion of an outer surface of said skirt portion, said safety shield being substantially liquid-tight with respect to cooking oils, said safety shield having a proximal end that makes physical contact with said skirt portion and having a distal end at an opposite, free end of the safety shield protrusion, said protruding safety shield re-directing an overspilling fluid away from a safety zone that is proximal to a portion of said second circumference of said skirt portion where said safety shield is located;

wherein said safety shield comprises a first planar portion and a second planar portion, said first planar portion makes up a left portion of an inverted V-shape and said second planar portion makes up a right portion of said inverted V-shape.

17. The attachment of claim 16, further comprising: an upturned barrier portion that extends in a somewhat vertical direction from said distal end of said safety shield.

18. An overspill deflector for use with cooking pots, said overspill deflector comprising:

a substantially annular structure that includes an adjustable fastener for mounting to an outer surface of a cooking pot, said annular structure, when mounted, wrapping completely around said outer surface of said cooking pot and increasing in outer diameter as said annular structure extends downward, said substantially annular structure being substantially liquid-tight with respect to cooking oils; and a safety shield that is mounted along a portion of an outer surface of said annular structure, said safety shield protruding outward from said annular structure, said safety shield being substantially liquid-tight with respect to cooking oils, said safety shield having a proximal end that makes physical contact with said annular structure and having a distal end at an opposite, free end of the safety shield protrusion;

wherein said safety shield comprises a first planar portion and a second planar portion, said first planar portion makes up a left portion of an inverted V-shape and said second planar portion makes up a right portion of said inverted V-shape.

19. The overspill deflector of claim 18, further comprising: an upturned barrier portion that extends in a somewhat vertical direction from said distal end of said safety shield.

* * * * *